US012347929B2

(12) United States Patent
Pourghorban Saghati et al.

(10) Patent No.: US 12,347,929 B2
(45) Date of Patent: Jul. 1, 2025

(54) ANTENNA FEED STRUCTURE

(71) Applicant: Apple Inc., Cupertino, CA (US)

(72) Inventors: Alireza Pourghorban Saghati, San Jose, CA (US); Jerzy S Guterman, Sunnyvale, CA (US); Jue Wang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 214 days.

(21) Appl. No.: 17/886,678

(22) Filed: Aug. 12, 2022

(65) Prior Publication Data

US 2024/0055768 A1 Feb. 15, 2024

(51) Int. Cl.
*H01Q 13/10* (2006.01)
*H01Q 9/04* (2006.01)

(52) U.S. Cl.
CPC ............. *H01Q 13/10* (2013.01); *H01Q 9/045* (2013.01)

(58) Field of Classification Search
CPC ...... H01Q 13/10; H01Q 9/045; H01Q 1/2283; H01Q 9/0457; H01Q 13/206; H01Q 13/16; H01Q 1/243; H01Q 9/0414; H01Q 1/50; H01Q 1/22; H01Q 1/36; H01Q 21/0006; H01L 23/3121; H04B 1/40
See application file for complete search history.

(56) References Cited

U.S. PATENT DOCUMENTS 10,193,222 B2* 1/2019 Mizunuma ............. H01Q 1/526
2013/0015563 A1* 1/2013 Lee ...................... H01Q 9/0414 257/659
2014/0035097 A1* 2/2014 Lin ......................... H01L 23/66 257/E29.325
2015/0270618 A1* 9/2015 Zhu ........................ H01Q 1/243 343/702
2019/0252757 A1* 8/2019 Baek ...................... H01Q 1/243
2019/0334231 A1* 10/2019 Sakurai ................... H01L 23/66
2020/0021010 A1* 1/2020 Ou ........................ H01Q 21/065
2020/0052367 A1 2/2020 Zhu et al.
2020/0052368 A1 2/2020 Xia et al.
2020/0381833 A1* 12/2020 Gianesello ............. H01Q 21/28
2023/0014567 A1* 1/2023 Yeon ...................... H01Q 13/10
2023/0163487 A1* 5/2023 Ma ....................... H01Q 9/0421 343/702

OTHER PUBLICATIONS

U.S. Appl. No. 17/380,491, filed Jul. 20, 2021.

* cited by examiner

*Primary Examiner* — Dimary S Lopez Cruz
*Assistant Examiner* — Anna N Hamadyk
(74) *Attorney, Agent, or Firm* — Treyz Law Group, P.C.; Tianyi He

(57) ABSTRACT

An electronic device may include one or more radios and one or more antennas. Radio-frequency transmission lines may couple a radio to an antenna feed structure. The antenna feed structure may be wireless coupled to one or more antenna resonating elements. An intervening slot element may be disposed between the antenna feed structure and the one or more antenna resonating elements. The antenna feed structure may be disposed on a package substrate forming an integrated circuit package. The one or more antenna resonating elements may be disposed on an antenna support structure. The integrated circuit package and the antenna support structure may be mounted to the same side or opposing sides of a system substrate.

17 Claims, 7 Drawing Sheets

ANTENNA FEED STRUCTURE

FIELD

This disclosure relates generally to electronic devices, including electronic devices with wireless circuitry.

BACKGROUND

Electronic devices can have wireless capabilities. An electronic device with wireless capabilities can have wireless circuitry that includes one or more antennas and one or more radios. A transmission line can connect a radio to a corresponding antenna.

However, structures that form physical contacts between the transmission line and the antenna can be costly and bulky, and consume excessive space within the electronic device. It can be challenging to design satisfactory connections to the antenna.

SUMMARY

An electronic device may include one or more radios and one or more antennas. Radio-frequency transmission lines may couple a radio to an antenna feed structure. The antenna feed structure may be wirelessly coupled to one or more antenna resonating elements. In particular, the antenna feed structure may be formed on package substrate for an integrated circuit package. The integrated circuit package may include encapsulation that encapsulate components on the package substrate. The one or more antenna resonating elements may be formed on the external surface of the integrated circuit package and/or may overlap the antenna feed structure.

If desired, the one or more antenna resonating elements may be disposed on an antenna support structure. As examples, the one or more antenna resonating elements may include slot antenna resonating elements in a conductive layer on the antenna support structure, and strip or patch antenna resonating elements in a conductive layer on the antenna support structure such as packet encapsulation.

If desired, an intervening slot in a conductive layer may be disposed between the antenna feed structure and the one or more antenna resonating elements. The wireless coupling between the antenna feed structure and the one or more antenna resonating elements may pass through the intervening slot. If desired, the slot may be configured as a frequency-selective filter that rejects radio-frequency signals at undesired frequencies.

An aspect of the disclosure provides an electronic device. The electronic device can include a package and an antenna resonating element external to the package. The package can include a substrate, a conductive patch on the substrate, and a radio-frequency transmission line coupled to the conductive patch. The antenna resonating element external to the package can be fed by the conductive patch via a wireless coupling.

An aspect of the disclosure provides an integrated circuit package. The integrated circuit package can include a substrate. The integrated circuit package can include a radio component mounted to the substrate. The integrated circuit package can include a signal conductor for a radio-frequency transmission line. The integrated circuit package can include an antenna feed element coupled to the radio component by the signal conductor. The integrated circuitry package can include an encapsulation over the substrate, the radio component, and the antenna feed element. The antenna feed element can be configured to electromagnetically couple to an antenna resonating element disposed over an exterior surface of the encapsulation.

An aspect of the disclosure provides wireless circuitry. The wireless circuitry can include a radio. The wireless circuitry can include a printed circuit substrate. The wireless circuitry can include a radio-frequency transmission line on the printed circuit substrate. The wireless circuitry can include an antenna feed structure on the printed circuit substrate and coupled to the radio by the radio-frequency transmission line. The wireless circuitry can include a first antenna resonating element that overlaps the printed circuit substrate and is indirectly fed by the antenna feed structure via electromagnetic coupling. The wireless circuitry can include a second antenna resonating element that overlaps the printed circuit substrate and is indirectly fed by the antenna feed structure via electromagnetic coupling.

DETAILED DESCRIPTION

Figure 1:
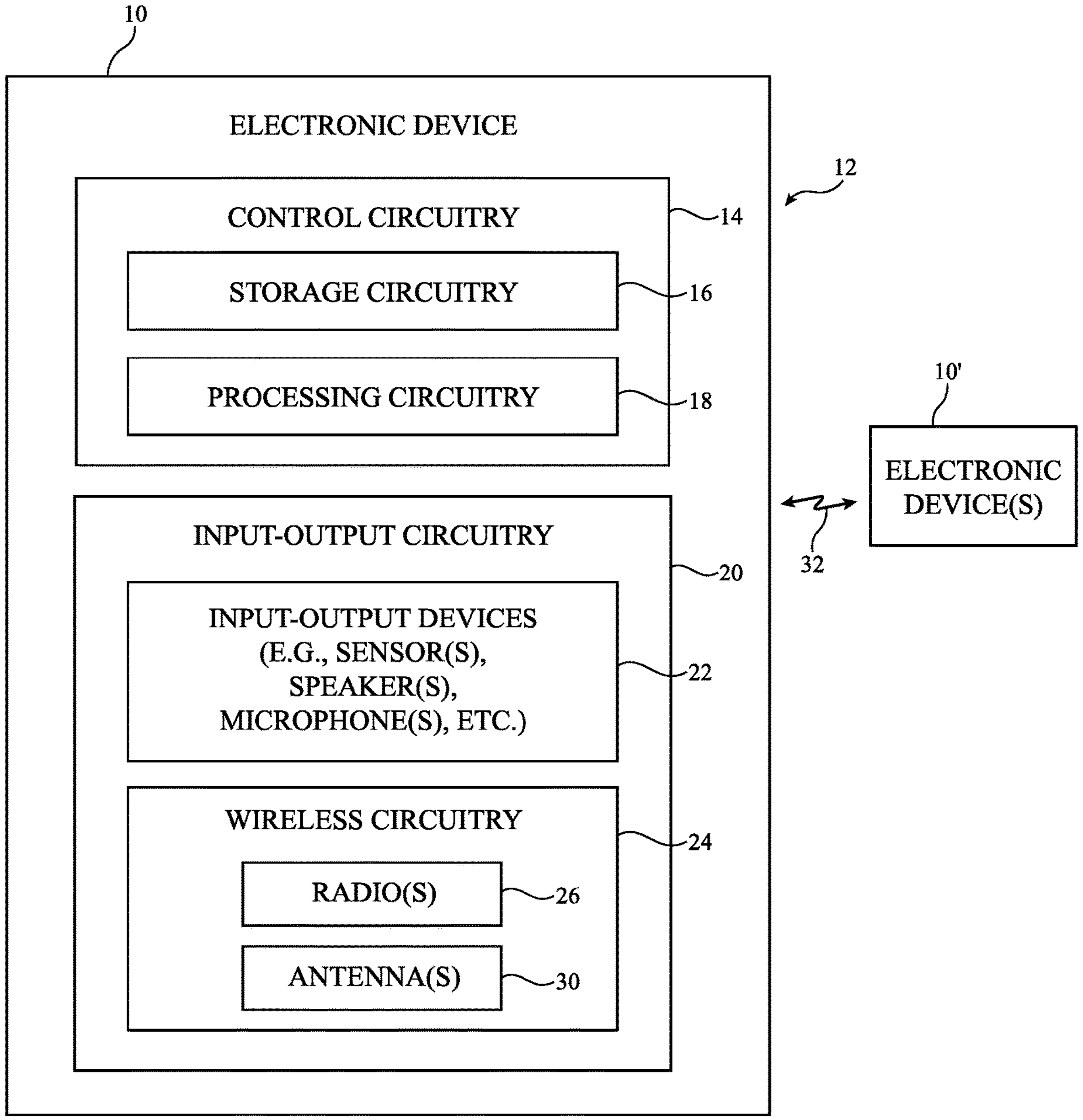
FIG. 1 is a block diagram of an illustrative electronic device having wireless circuitry in accordance with some embodiments.

An electronic device such as electronic device 10 of FIG. 1 may be provided with wireless circuitry. The wireless circuitry may include one or more radios and one or more antennas. A radio may be coupled to an antenna using an antenna feed structure. In particular, a transmission line may convey radio-frequency signals between the radio and the antenna feed structure. The radio-frequency signals may be conveyed between the antenna feed structure and one or more antenna resonating elements using wireless coupling such as an electromagnetic near-field coupling. Using the wireless coupling, undesired physical contacts used to feed the antenna may be omitted.

Electronic device 10 of FIG. 1 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device such as an earbud, a pair of earbuds, or a pair of earbuds with a corresponding case that houses the earbuds, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the functional block diagram of FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more processors, microprocessors, microcontrollers, digital signal processors, host processors, baseband processor integrated circuits, application specific integrated circuits, central processing units (CPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications and/or radio-based spatial ranging operations. Wireless circuitry 24 may include one or more antennas 30. Wireless circuitry 24 may also include one or more radios 26. Each radio 26 may include circuitry that operates on signals at baseband frequencies (e.g., baseband processor circuitry), signal generator circuitry, modulation/demodulation circuitry (e.g., one or more modems), radio-frequency transceiver circuitry (e.g., radio-frequency transmitter circuitry, radio-frequency receiver circuitry, mixer circuitry for downconverting radio-frequency signals to baseband frequencies or intermediate frequencies between radio and baseband frequencies and/or for upconverting signals at baseband or intermediate frequencies to radio-frequencies, etc.), amplifier circuitry (e.g., one or more power amplifiers and/or one or more low-noise amplifiers (LNAs)), analog-to-digital converter (ADC) circuitry, digital-to-analog converter (DAC) circuitry, control paths, power supply paths, signal paths (e.g., radio-frequency transmission lines, intermediate frequency transmission lines, baseband signal lines, etc.), switching circuitry, filter circuitry, and/or any other circuitry for transmitting and/or receiving radio-frequency signals using antenna(s) 30. The components of each radio 26 may be mounted onto a respective substrate or integrated into a respective integrated circuit, chip, package (e.g., system-in-package), or system-on-chip (SOC). If desired, the components of multiple radios 26 may share a single substrate, integrated circuit, chip, package, or SOC.

Antenna(s) 30 may be formed using any desired antenna structures. For example, antenna(s) 30 may include antennas with resonating elements that are formed from loop antenna structures, patch or strip antenna structures, inverted-F antenna structures, slot antenna structures, planar inverted-F antenna structures, helical antenna structures, monopole antenna structures, dipole antenna structures, hybrids of these designs, etc. Filter circuitry, switching circuitry, impedance matching circuitry, and/or other antenna tuning components may be adjusted to adjust the frequency response and wireless performance of antenna(s) 30 over time.

Transceiver circuitry in radios 26 may convey radio-frequency signals using one or more antennas 30 (e.g., antenna(s) 30 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antenna(s) 30 may transmit the radio-frequency signals by radiating the radio-frequency signals into free space (or to free space through intervening device structures such as a dielectric cover layer). Antenna(s) 30 may additionally or alternatively receive the radio-frequency signals from free space (e.g., through intervening devices structures such as a dielectric cover layer). The transmission and reception of radio-frequency signals by antenna(s) 30 each involve the excitation or resonance of antenna currents on an antenna resonating element in the antenna by the radio-frequency signals within the frequency band(s) of operation of the antenna.

Radios 26 may use antenna(s) 30 to transmit and/or receive radio-frequency signals within different frequency bands at radio frequencies (sometimes referred to herein as communications bands or simply as a "bands"). The frequency bands handled by radios 28 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-300 GHz, near-field communications (NFC) frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Each radio 26 may transmit and/or receive radio-frequency signals according to a respective radio access technology (RAT) that determines the physical connection methodology for the components in the corresponding radio. One or more radios 26 may implement multiple RATs if desired. As just one example, the radios 26 in device 10 may include a UWB radio for conveying UWB signals using one or more antennas 30, a Bluetooth (BT) radio for conveying BT signals using one or more antennas 30, a Wi-Fi radio for conveying WLAN signals using one or more antennas 30, a cellular radio for conveying cellular telephone signals using one or more antennas 30 (e.g., in 4G frequency bands, 5G FR1 bands, and/or 5G FR2 bands), an NFC radio for conveying NFC signals using one or more antennas 30, and a wireless charging radio for receiving wireless charging signals using one or more antennas 30 for charging a battery on device 10. This example is illustrative and, in general, radios 26 may include any desired combination of radios for covering any desired combination of RATs.

Radios 26 may use antenna(s) 30 to transmit and/or receive radio-frequency signals to convey wireless communications data between device 10 and external wireless communications equipment such as one or more electronic devices 10' (e.g., one or more other devices such as device 10, a wireless access point or base station, etc.) via communications link(s) 32. Wireless communications data may be conveyed by radios 26 bidirectionally or unidirectionally. The wireless communications data may, for example, include data that has been encoded into corresponding data packets such as wireless data associated with a telephone call, streaming media content, internet browsing, wireless data associated with software applications running on device 10, email messages, etc. Radios 26 may also use antenna(s) 30 to perform spatial ranging operations (e.g., for identifying a distance between device 10 and an external object). Radios 26 that perform spatial ranging operations may include radar circuitry if desired (e.g., frequency modulated continuous wave (FMCW) radar circuitry, OFDM radar circuitry, FSCW radar circuitry, a phase coded radar circuitry, other types of radar circuitry).

Configurations in which device 10 is a headset, headphone, earphone, or earbud are sometimes described herein as illustrative examples. In these configurations, one or more devices 10', with which device 10 performs wireless communications, may include a primary device (e.g., a laptop computer, a desktop computer, a tablet computer, a cellular telephone, etc.) for which device 10 is an accessory. In an illustrative configuration in which device 10 is an earbud for one of a user's ears, device 10 may perform wireless communications with device 10' which may be an earbud for the other one of the user's ears. These configurations for devices 10 and 10' are illustrative. If desired, devices 10 and 10' may include any number of electronic devices that communicate with one another wirelessly.

The example of FIG. 1 is illustrative. While control circuitry 14 is shown separately from wireless circuitry 24 in the example of FIG. 1 for the sake of clarity, wireless circuitry 24 may include processing circuitry (e.g., one or more processors) that forms a part of processing circuitry 18 and/or storage circuitry that forms a part of storage circuitry 16 of control circuitry 14 (e.g., portions of control circuitry 14 may be implemented on wireless circuitry 24). Wireless circuitry 24 may include any desired number of antennas 30. Some or all of the antennas 30 in wireless circuitry 24 may be arranged into one or more phased antenna arrays (e.g., for conveying radio-frequency signals over a steerable signal beam). If desired, antenna(s) 30 may be operated using a multiple-input and multiple-output (MIMO) scheme and/or using a carrier aggregation (CA) scheme.

Figure 2:
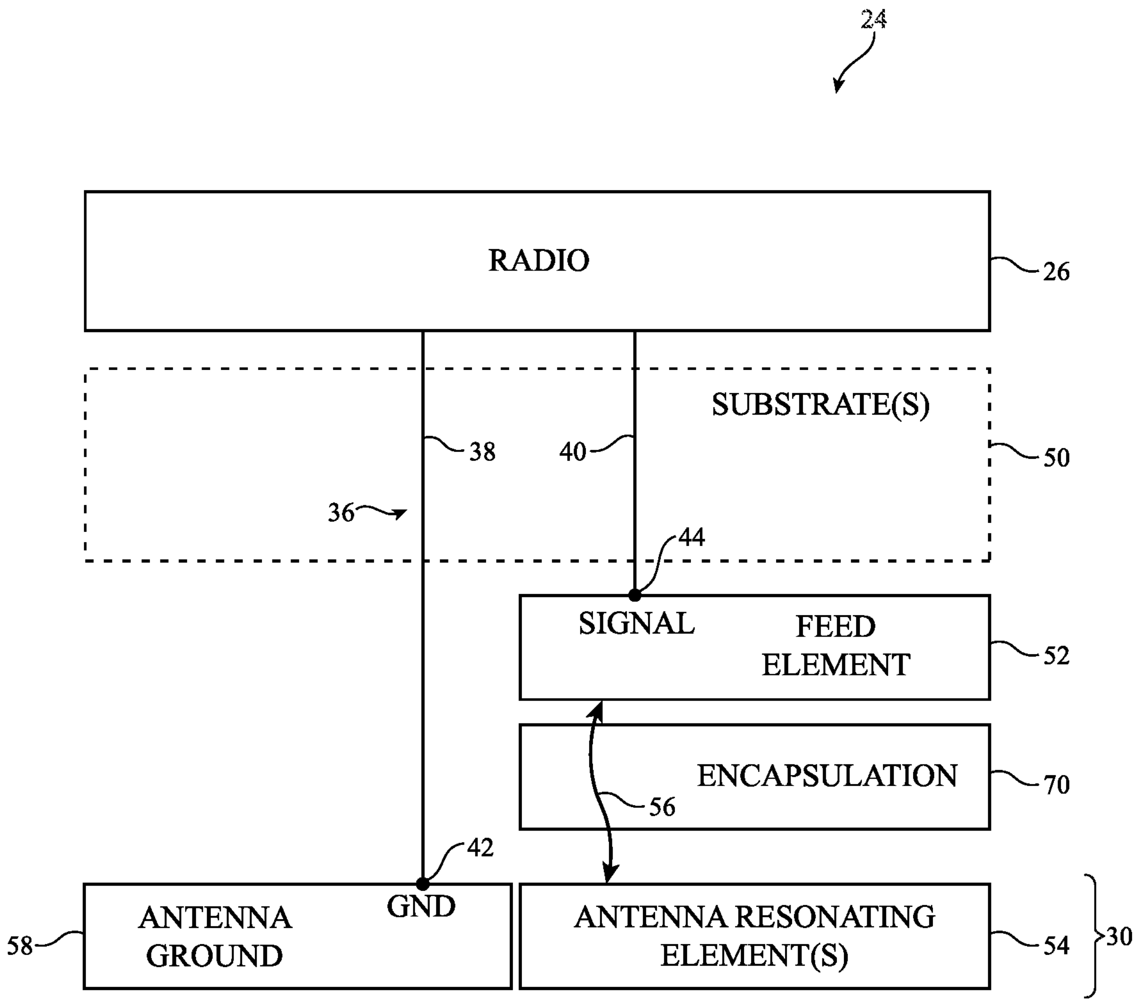
FIG. 2 is a block diagram of illustrative wireless circuitry having a feed element wirelessly coupled to an antenna resonating element in accordance with some embodiments.

FIG. 2 is a functional block diagram of wireless circuitry 24 of FIG. 1. As shown in FIG. 2, each radio 26 may be (communicably) coupled to one or more antennas 30 over one or more radio-frequency transmission lines 36. As an illustrative example, each radio-frequency transmission line 36 may include a ground conductor such as ground conductor 38 and a signal conductor such as signal conductor 40. Transmission line 36 may be coupled to a corresponding antenna 30 using an antenna feed.

An antenna feed can require physical contact structures to form electrical contacts to the antenna. However, in some illustrative configurations, it may be undesirable to form these contact structures. In particular, these physical contacts need to take into account both electrical connection considerations as well as mechanical considerations, leading to undesired design and manufacturing complexities. In one example, vias and pins can be used to form the physical contacts. However, vias and pins can take up excessive space and require a solid support structure, all the while needing to meet impedance matching and manufacturing requirements. It can therefore be desirable to omit these physical contact structures to the antenna.

As shown in FIG. 2, antenna 30 may be fed using a wireless or contactless feeding scheme to mitigate the above-mentioned physical contact issues. In particular, signal conductor 40 may be coupled to an antenna (signal) feed terminal 44 at feed element 52 (sometimes referred to herein as antenna feed element 52, antenna feed structure 52, or feed structure 52). Feed element 52 may be formed from a (metal) conductor such as a conductive patch, a conductive strip, or a conductor having other patterns. Feed element 52 may be coupled to one or more antenna resonating elements 54 in antenna 30 via wireless coupling 56. As an example, wireless coupling 56 may be an electromagnetic coupling or more specifically an electromagnetic near-field coupling. Ground conductor 38 may be coupled to an antenna (ground) feed terminal 42 at an antenna ground structure 58.

One or more radio-frequency transmission lines 36 may be shared between radios 26 and/or antennas 30 if desired. Radio-frequency front end (RFFE) modules may be interposed on one or more radio-frequency transmission lines 36. The radio-frequency front end modules may include substrates, integrated circuits, chips, or packages that are separate from radios 26 and may include filter circuitry, switching circuitry, amplifier circuitry, impedance matching circuitry, radio-frequency coupler circuitry, and/or any other desired radio-frequency circuitry for operating on the radio-frequency signals conveyed over radio-frequency transmission lines 36.

To provide compact radio-frequency transmission line structures, wireless circuitry 24 may include one or more radio-frequency transmission lines 36 that are implemented from radio-frequency transmission line structures (e.g., signal traces, ground traces, etc.) spanning across one or more substrates 50 such as printed circuit substrates. Because electronic devices can include (printed circuit) substrates to which other device components (e.g., storage circuitry 16, processing circuitry 18, radios 26, etc.) are mounted, integration of radio-frequency transmissions line structures into these printed circuit structures requires fewer additional bulky structures compared to configurations in which a dedicated co-axial cable connection is used.

One or more substrates 50 onto which transmission line structures are integrated may include one or more substrates for rigid printed circuit boards and/or flexible printed circuits. As an example, a flexible printed circuit can include a flexible printed circuit substrate formed from polyimide, liquid crystal polymer, other flexible polymer materials, or other suitable materials. If desired, the flexible printed circuit may include multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). As a further example, a rigid printed circuit board may include a (rigid) printed circuit substrate formed from rigid printed circuit board material such as fiberglass-filled epoxy or fiberglass-epoxy laminate, ceramics, other rigid polymer materials, or other suitable materials. If desired, a printed circuit substrate may be formed from one or more of these flexible and/or rigid materials (e.g., at different portions of the substrate).

One or more substrates 50 onto which transmission line structures are integrated may include one or more substrates for any suitable system. As illustrative examples, these substrates may include a package substrate such as a substrate to which one or more components and/or integrated circuit (IC) dies for a packaged system are mounted (e.g., implementing a system-in-package (SiP)), an interposer substrate such as a substrate in which conductive routing structures are formed to route signals between two or more of IC dies, packaged systems, printed circuits, etc. (e.g., implementing an interposer), or any other substrate. Because an illustrative SiP and an illustrative interposer may both include conductive (routing) traces, vias, and other structures, a SiP or an interposer may sometimes be referred to herein as a printed circuit.

In support of the wireless feeding scheme using feed element 52, the transmission line structures on one or more substrates 50 forming signal conductor 40 may be connected to feed element 52. Feed element 52 may be formed on one of the substrates 50 such that the connection to feed terminal 44 can be provided locally on the substrate. Because wireless coupling 56 between feed element 52 and one or more antenna resonating elements 54 is provided without physical feed contacts, the one or more antenna resonating elements 54 may be placed within device 10 without having to consider the design and routing of transmission line conductors to the one or more antenna resonating elements 54. In particular, while a transmission line with designed characteristics is still provided, the transmission line may physically connect to feed element 52, which wirelessly couples to one or more antenna resonating elements 54.

The one or more antenna resonating elements 54 may be disposed relative to feed element 52 such that antenna currents on feed element 52 may induce corresponding antenna currents on the one or more antenna resonating elements 54 and vice versa (via wireless coupling 56). As an example, the one or more antenna resonating elements 54 may at least partially overlap feed element 52 with a non-zero separation (e.g., as provided by dielectric material or non-conductive layers) therebetween. As one illustrative example, the intervening material providing the non-zero separation may include an encapsulation such as encapsulation 70 for an integrated circuit package in which feed element 52 is disposed, a dielectric (e.g., plastic) support antenna support structure, and/or other non-conductive layers. Because a wireless coupling is used to convey radio-frequency signals onto antenna resonating elements 54, this may sometimes be referred to as indirectly feeding antenna resonating elements 54 as opposed to directly feeding antenna resonating elements 54 using one or more physical feed contacts to antenna resonating elements 54.

Figure 3:
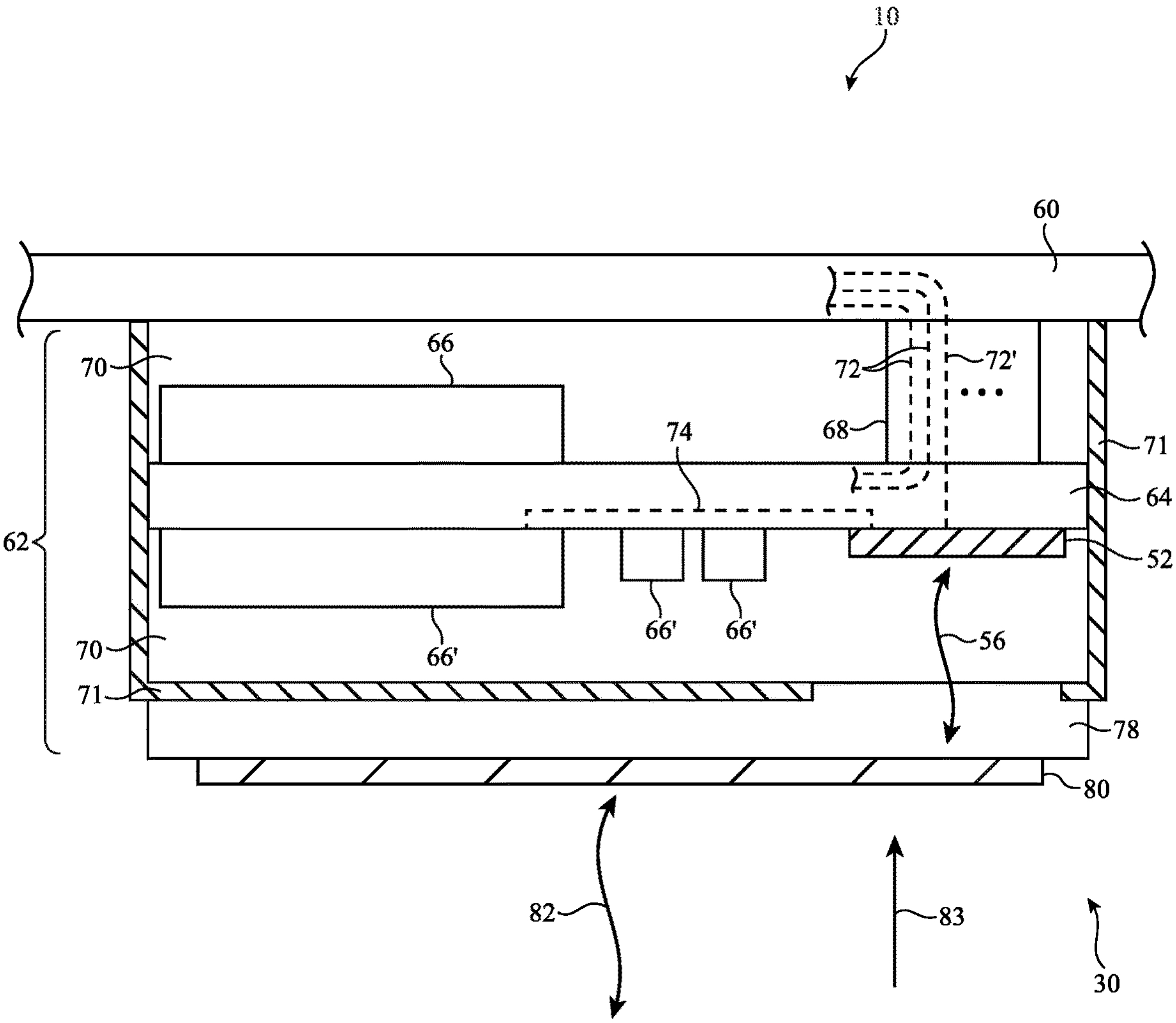
FIG. 3 is a cross-sectional view of illustrative antenna structures disposed on multiple stacked substrates in accordance with some embodiments.

FIG. 3 is a cross-sectional view of a portion of device 10 that may be used to implement wireless circuitry 24 having feed element 52 used to indirectly feed one or more antenna resonating elements for antenna 30. In the example of FIG. 3, device 10 may include a first printed circuit substrate such as substrate 60. Substrate 60 may be a rigid printed circuit board substrate, a flexible printed circuit substrate, a hybrid rigid-flexible printed circuit substrate, or any other suitable type of substrate. In some implementations described herein as an illustrative example, substrate 60 may be a flexible printed circuit substrate for a main system printed circuit which provides structural support and signal routing to and from different functional components or subsystems in device 10. In these arrangements, system substrate 60 may extend across substantially the entirety of device 10 (e.g., from one end of housing 12 to the opposing end of housing 12).

A portion of substrate 60 to which an electronic component such as an integrated circuit package 62 is mounted (e.g., surface-mounted, soldered, etc.) is shown in the example of FIG. 3. Other components forming other functional subsystems such as those forming one or more input-output devices such as sensors, speakers, microphones, etc., wireless circuitry, control circuitry, power management circuitry, one or more batteries, or other device components may also be mounted to substrate 60. Connections such as buses or other conductive signal paths 72 in substrate 60 may convey signals between these components, e.g., to and from package 62 in the example of FIG. 3. Conductive structures such as conductive metal traces, conductive metal vias, interconnect layers, routing layers, etc., may be disposed on (e.g., embedded within, disposed on one or more external surfaces of, or disposed in other manners on one or more portions of) substrate 60 to form these conductive signal paths.

Integrated circuit package 62 mounted to system substrate 60 may include multiple integrated circuit dies that implement corresponding functional subsystems thereby forming one or more of control circuitry, wireless circuitry, other non-wireless or non-radio input-output circuitry, and other functional circuitry all within package 62. In this configuration, package 62 may form a system-in-package (SiP). In particular, integrated circuit package 62 may include a package substrate such as printed circuit substrate 64 and multiple components 66 mounted to both sides of package substrate 64. Substrate 64 may be rigid printed circuit substrate or may, if desired, be any other suitable type of substrate such as those described in connection with substrate 60.

Components 66 mounted to package substrate 64 may include one or more integrated circuit dies (e.g., each implementing one or more of storage circuitry 16, processing circuitry 18, radio(s) 26, signal processing circuitry and driver circuitry for one or more input-output devices, power management circuitry, clock management circuitry, or other functional circuitry), other active components (e.g., input-output devices 22, programmable devices, diodes, other semiconductor devices, etc.), passive components (e.g., resistors, capacitors, inductors, etc.), electromechanical components, and any other suitable discrete devices.

In one illustrative configuration, some of components 66 (e.g., components 66') mounted to substrate 64 may implement radio 26 covering one or more RATs (e.g., an integrated circuit die that includes one or more radios, one or more processors that implement radio 26, a radio-frequency front end module, etc.). A radio-frequency transmission line such as radio-frequency transmission line 36 (FIG. 2), and if desired, one or more additional radio-frequency transmission lines, may couple radio 26 (e.g., component 66' implementing radio 26) to one or more antennas.

In the example of FIG. 3, one or more conductive paths 74 on substrate 64 may form radio-frequency transmission line 36 (FIG. 2). Conductive paths 74 may form a signal conductor and a ground conductor. The ground conductor may connect to one or more ground structures in device 10 backing feed element 52 such as ground traces on substrate 64, ground traces on substrate 60, etc. The signal conductor may be coupled to an antenna feed structure such as feed element 52.

As an example, a radio component 66' may implement an integrated circuit die forming one or more processors for radio 26. The radio component 66' may be coupled to antenna feed structure 52 via transmission line structures formed using paths 74. If desired, a separate radio component 66' implementing a front end module may be coupled along paths 74. The transmission line structures coupling radio component 66' to antenna feed structure 52 may be formed based on any suitable type of transmission line such as a microstrip transmission line, a stripline transmission line, etc.

Feed structure 52 may be configured to indirectly feed one or more antenna resonating elements formed using conductive structure 80 via electromagnetic coupling 56. As shown in FIG. 3, antenna feed structure 52 may also be formed on package substrate 64. Feed element 52 may be a conductive patch (e.g., having an elongated strip shape) that is deposited, patterned, and/or otherwise disposed on package substrate 64. Feed element 52 may be formed from conductive metal traces embedded within or on a surface of printed circuit substrate 64. Based on radio-frequency signals conveyed to from radio 26 to feed element 52 through the transmission line structures, antenna currents may be present on feed element 52. These antenna currents on feed element 52 may excite one or more antenna resonating elements on conductive structure 80 through wireless coupling 56, thereby producing corresponding antenna current on conductive structure 80 from which radio-frequency signals 82 are conveyed. In an analogous manner, radio-frequency signals 82 received at conductive structure 80 may induce, via wireless coupling 56, corresponding antenna currents on feed element 52 that are conveyed to radio 26.

The omission of a physical connection to one or more antenna resonating elements formed by conductive structure 80 allows the package 62 to be fully encapsulated without needing to design and manufacture dedicated feeding structures that extend to conductive structure 80. As shown in FIG. 3, components 66 on a first side of substrate 64 are covered by encapsulation 70 and components 66 on a second side of substrate 64 are also covered by encapsulation 70. If desired, an electromagnetic shielding layer such as shielding layer 71 may be deposited on one or more (e.g., substantially all exterior facing) sides of encapsulation 70. Shielding layer 71 may shield components in package 62 from undesired electromagnetic interference.

Encapsulation 70 may include encapsulation material, underfill material, or other sealant or encapsulant materials. Encapsulation 70 may be formed from any suitable number and type of encapsulant material such as plastics or specifically thermoplastics, ceramic, etc. Similarly, any suitable process such as spin-on, molding, underfill, etc., may be used to form encapsulation 70 and shielding layer 71.

In an illustrative configuration in which package 62 is substantially fully encapsulated and shielded to protect against undesired weathering, temperature, and electromagnetic effects, an interposer such as interposer 68 can serve as the exclusive electrical input-output interface through which components on package 62 are accessed through substrate 64 by other components in device 10. In particular, connections to system substrate 60 may be made through external contacts on one side of interposer 68, while connections to package substrate 64 may be made through encapsulated contacts on the opposing side of interposer 68. In the example of FIG. 3, conductive signal paths 72 may connect system substrate 60 to components 66 through package substrate 64.

Conductive structure 80 may be disposed over encapsulation 70 on package 62 on the same side on which feed element 52 is disposed. If desired, conductive structure 80 may be formed directly on encapsulation 70 and/or shielding layer 71 (if present), or may be formed on one or more intervening dielectric layers forming an antenna support structure on encapsulation 70 and shielding layer 71.

As an example, a support structure such as dielectric support structure 78 may be disposed over package 62 (e.g., over encapsulation 70 of package 62), and conductive element 80 may be formed on dielectric support structure 78. If desired, support structure 78 may be a plastic carrier and conductive element 80 may be patterned and electroplated onto the plastic carrier using a laser direct structuring (LDS) process. If desired, support structure 78 may be a printed circuit substrate or other dielectric substrate, and conductive element 80 may be formed as conductive traces or a conductive layer on the substrate. These examples are illustrative of some of many possible arrangements. If desired, conductive element 80 may be provided in any suitable manner to wirelessly couple to feed element 52.

If desired, conductive structure 80 may be disposed within package 62 instead being provided on an exterior surface of package 62. In particular, conductive structure 80 may be formed within encapsulation 70 (using one or more layers within encapsulation 70 as the antenna support structure), while still overlapping feed element 52. In this arrangement, the window in shielding layer 71 may overlap the one or more portions (e.g., the entirety) of conductive structure 80.

In one illustrative implementation as described above, one or more components 66' within package 62 may form radio 26 connected to feed element 52 which indirectly feeds antenna 30. This is illustrative of one of many possible implementations. In another illustrative implementation, components external to package 62 but mounted to system substrate 60 may form radio 26. In this implementation, one or more of conductive paths 72 (e.g., conductive path 72') may form transmission line structures that connect radio 26 external to package 62 to feed element 26 within package 62. Radio 26 may be provided at any suitable location within device 10 and may connect to feed element 52 (within package 62) which is wirelessly coupled to one or more antenna resonating elements on conductive structure 80. If desired, path 72' may be connect to component 66' forming a radio component such as a radio-frequency front end module before connecting to feed element 52.

Because one or more antenna resonating elements on conductive structure 80 are fed through a wireless coupling 56, conductive structure 80 may be disposed in any suitable manner that provides sufficient coupling between feed element 52 and the antenna resonating elements. As an example, one or more antenna performance metrics (e.g., associated with antenna gain, antenna bandwidth, antenna impedance, etc.) associated with each antenna resonating elements being above corresponding threshold values may be indicative of sufficient coupling.

In configurations in which an electromagnetic shielding layer such as shielding layer 71 is provided over encapsulation 70, a window or opening may be provided in shielding layer 71 to allow for and/or improve wireless coupling 56 between feed element 52 and antenna 30. As shown in FIG. 3, the window in shielding layer 71 may overlap feed element 52.

Figure 4:
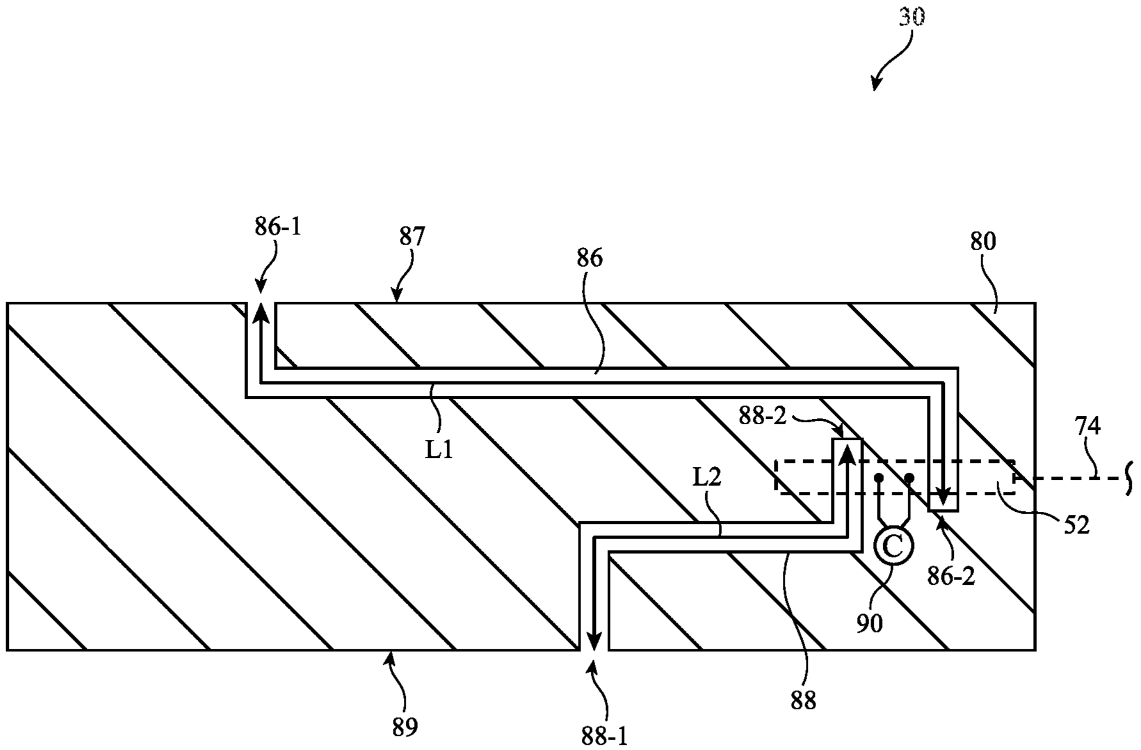
FIG. 4 is a top-down view of an illustrative implementation of antenna structures of the type shown in FIG. 3 in accordance with some embodiments.

FIG. 4 is a top-down view of an illustrative antenna resonating element configuration that may be implemented in conjunction with a wireless antenna feeding scheme (e.g., as viewed in direction 83 of FIG. 3).

In the example of FIG. 4, antenna 30 may include first and second slot elements 86 and 88 formed in conductive structure 80. Slot elements 86 and 88 may be formed from dielectric material such as air, solid dielectric material, etc., between conductive portions of conductive structure 88. Slot element 86 may have an open end 86-1 along edge 87 of conductive structure 80 and an opposing closed end 86-2 defined by a portion of conductive structure 80. Slot element 88 may have an open end 88-1 along edge 89 of conductive structure 80 and an opposing closed end 88-2 defined by a portion of conductive structure 80. Feed element 52 may overlap each of slot elements 86 and 88 at their respective closed ends. If desired, feed element 52 may overlap each of slot elements 86 and 88 at other locations.

As shown in FIG. 4, each of slot elements 86 and 88 may include one or more meandering portions. In particular, slot element 86 may have two substantially parallel portions connected to each other by a non-parallel (e.g., substantially perpendicular) portion. Similarly, slot element 88 may have two substantially parallel portions connected to each other by a non-parallel (e.g., substantially perpendicular) portion. Slot element 86 may have a longitudinal length L1 across its three portions that is larger than the longitudinal length L2 of slot element 88 across its three portions. In such a manner, slot element 86 may be configured to convey radio-frequency signals at frequencies lower than respective frequencies at which slot element 88 conveys radio-frequency signals.

A transmission line structure such as a signal conductor formed by signal path 74 (or signal path 72') may convey radio-frequency signals at resonant frequencies of slot elements 86 and 88. Antenna currents on feed element 52 produced at these radio-frequencies may be conveyed via electromagnetic coupling to slot elements 86 and 88, thereby configuring them as corresponding slot antenna resonating elements. In particular, antenna currents on feed element 52 may induce corresponding antenna currents at portions of conductive structure 80 defining edges of slot element 86 and 88. Upon reception of corresponding radio-frequency signals, antenna currents along edges of slot elements 86 and 88 may induce via electromagnetic coupling corresponding antenna currents on feed element 52. Slot elements 86 and 88 may be sometimes be referred to herein as slots, slot radiating elements, or slot antenna resonating elements.

If desired, one or more coupling components 90 may be coupled to feed element 52. Coupling components 90 may be configured to increase the coupling factor between feed element 52 and one or more antenna resonating elements on conductive structure 80 such as slot antenna resonating elements 86 and 88. As examples, a coupling component 90 may include inductive elements, capacitive elements, or a combination of inductive and capacitive elements. An arrangement in which coupling component 90 is mounted to package substrate 64 and has first and second terminal both coupled to feed element 52 are sometimes described herein as an illustrative example. If desired, one or more coupling components 90 may be coupled to feed element 52 in other manners to increase the wireless coupling factor between feed element 52 and the one or more antenna resonating elements on conductive structure 80.

The example of FIG. 4 is illustrative of one of many possible arrangements. If desired, any suitable number of antenna resonating elements may be formed on conductive structure 80. As examples, conductive structure 80 may define or other form, a single antenna resonating element, three antenna resonating elements, more than three antenna resonating elements, etc., one or more of which may be electromagnetically coupled to feed element 52.

Slot elements 86 and 88 may each have any desired shape. For example, slot elements 86 and 88 may each have a linear shape, a meandering shape with different segments extending in different directions than shown in FIG. 4, may have straight and/or curved edges, etc. Slot elements tend to exhibit response peaks when the slot perimeter is equal to a target effective wavelength. The effective wavelength may be equal to a freespace wavelength multiplied by a constant value that is determined by the dielectric materials in and surrounding the slot element.

In elongated slot elements such as slot elements 86 and 88 where the length is much greater than the width (e.g., the length greater than four times the width, the length greater than eight times the width, the length greater than ten times the width, the length greater than twenty times the width, the length greater than fifty times the width, etc.), the response peaks may be exhibited when the slot length (length L1 or L2 in FIG. 4) is approximately half of the target wavelength (e.g., is slightly less than half of the target wavelength given a non-zero slot width). Accordingly, the dimensions of slot elements 86 and 88 may be configured to cover desired frequencies of interest. As an example, slot element 86 may be configured to convey radio-frequency signals in a 2.4 GHz frequency band (e.g., a 2.4 GHz WLAN band, the 2.4 GHz Bluetooth® band, etc.) while slot element 88 may be configured to convey radio-frequency signals in a 5 GHz frequency band (e.g., a 5 GHz WLAN band). If desired, one or both of slot elements 86 and 88 may operate in or cover different frequency bands such as cellular telephone frequency bands or other frequency bands.

If desired, conductive structure 80 may, instead of or in addition to slot elements 86 and 88, form one or more non-slot antenna resonating elements. As examples, conductive structure 80 may form one or more loop antenna resonating elements, patch or strip antenna resonating elements, inverted-F antenna resonating elements or planar inverted-F antenna resonating elements (e.g., with the inclusion of a physical connection for a shorting pin), helical antenna resonating elements, monopole antenna resonating elements, dipole antenna resonating elements, etc. One illustrative configuration in which one or more non-slot antenna resonating elements is implemented in conjunction with a wireless antenna feeding scheme is described below.

Figure 5:
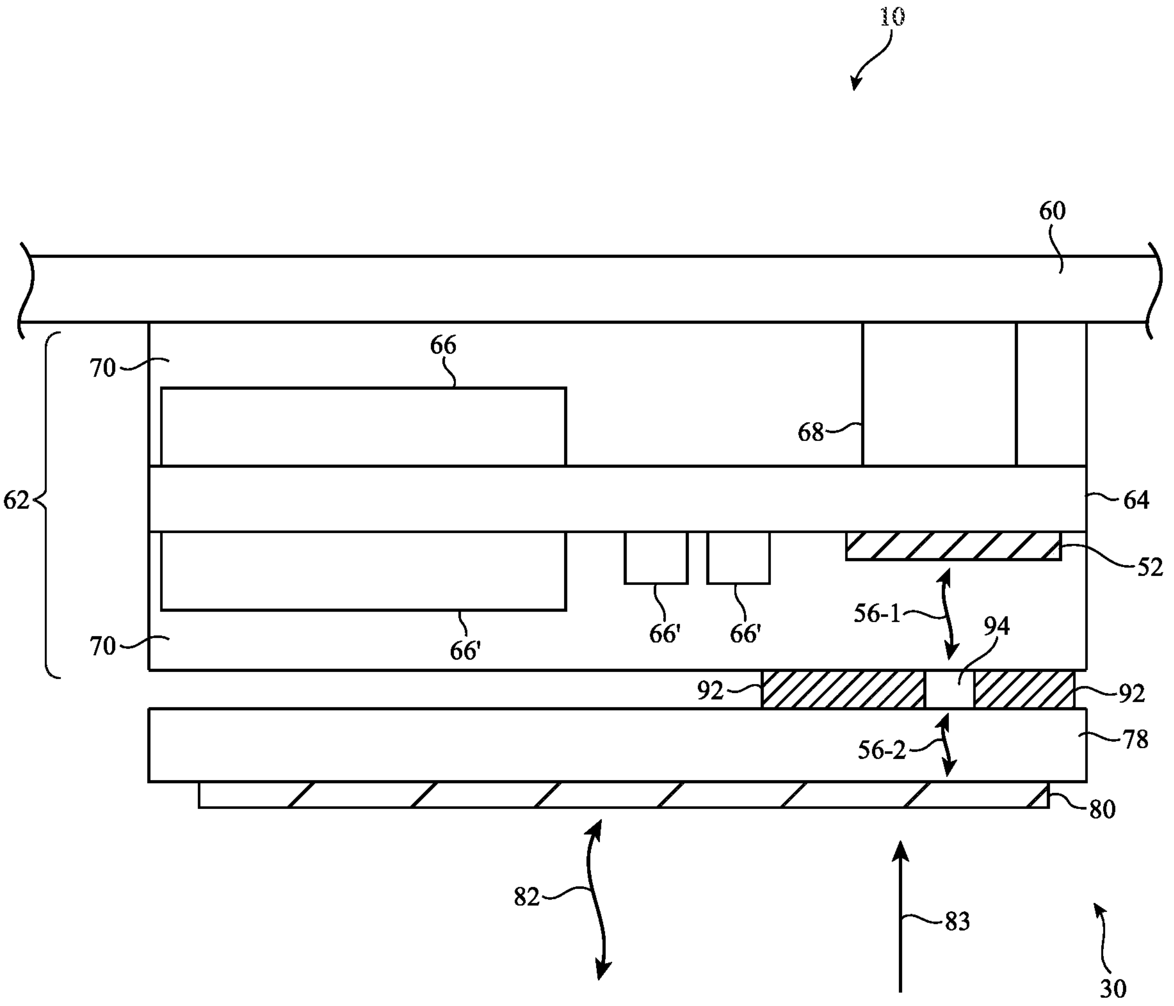
FIG. 5 is a cross-sectional view of illustrative antenna structures that include an intervening conductive layer in accordance with some embodiments.

If desired, the wireless coupling between a feed element and one or more antenna resonating elements as depicted in FIG. 3 may pass through an intervening slot element. FIG. 5 is a cross-sectional view of a portion of device 10 (e.g., the same portion of device 10 shown in claim 3) that may be used to implement wireless circuitry 24 having feed element 52 used to indirectly feed, through an intervening slot element, one or more antenna resonating elements for antenna 30.

As shown in FIG. 5, conductive structure 92 may be disposed between feed element 52 and conductive structure 80 forming one or more antenna resonating elements. In particular, a dielectric-filled slot element such as slot element 94 may have lateral edges defined by portions of conductive structure 92. Conductive structure 92 may disposed over encapsulation 70 of package 62. In the example of FIG. 5, conductive structure 92 may be formed on a first side of support structure 78 while conductive structure 82 may be formed on a second opposing side of support structure 78. This is illustrative of one of many possible arrangements of conductive structure 92. If desired, conductive structure 92 may be formed separately from support structure 78 with intervening structures therebetween. As examples, conductive structure 92 may be formed on a substrate separate from support structure 78, may be formed on or within encapsulation material 70, etc., and support structure 78 on which conductive structure 80 is disposed may simply overlap conductive structure 92.

Slot element 94 in conductive structure 92 may help electromagnetically couple feed element 52 to one or more antenna resonating elements formed using conductive structure 80. In particular, antenna currents on antenna feed structure 52 may first induce corresponding antenna currents along the lateral edges of slot element 94 via wireless coupling 56-1. Antenna currents along the lateral edges of slot element 94 may then induces corresponding antenna currents on one or more antenna resonating elements formed using conductive structure 80 via wireless coupling 56-2. Conductive structure 92 may be grounded at one or more locations, or if desired, may be electrically floating.

In some illustrative arrangements, slot element 94 may serve as a filtering element to filter out radio-frequency signals at one or more undesired frequencies (e.g., harmonic frequencies). In particular, the lateral dimensions (e.g., length and width) of slot element 94 may be configured to reject or block radio-frequency signals at the one or more undesired frequencies. Slot element 94 may sometimes be referred to herein as a slot or an opening.

Figure 6:
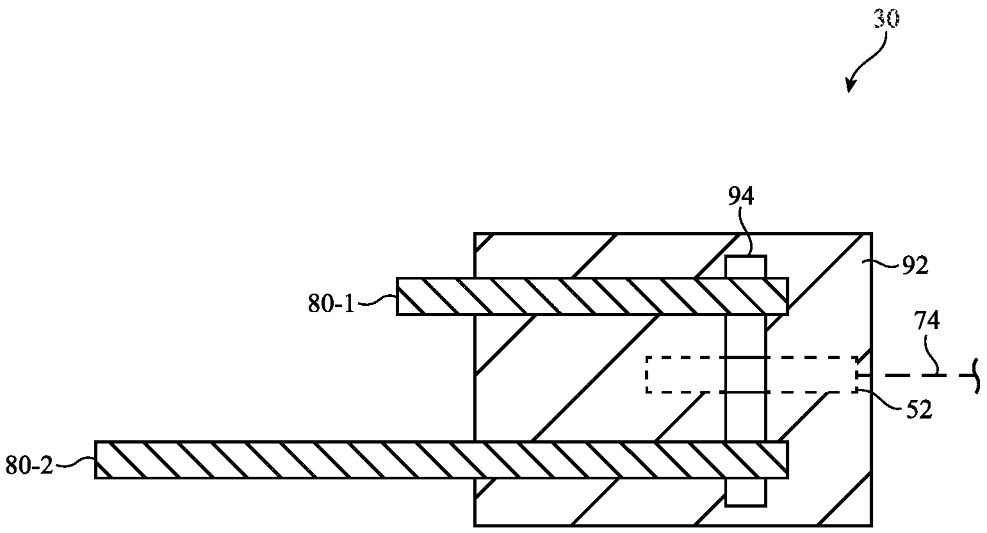
FIG. 6 is a top-down view of an illustrative implementation of antenna structures of the type shown in FIG. 5 in accordance with some embodiments.

FIG. 6 is a top-down view of an illustrative antenna resonating element configuration implemented using an indirect antenna feeding scheme with an intervening slot element (e.g., as viewed in direction 83 of FIG. 5).

In the example of FIG. 6, conductive structure 80 such as a metal layer may include first and second conductive portions 80-1 and 80-2 forming respective strips of conductive material. In this configuration, conductive structure 80-1 and 80-2 may each be referred to herein as forming a strip element, a strip antenna resonating element, a patch element, or a patch antenna resonating element. Antenna resonating element 80-1 may have a longitudinal dimension (e.g., length) that is smaller than the longitudinal dimension (e.g., length) of slot element 80-2. In such a manner, antenna resonating element 80-1 may be configured to convey radio-frequency signals at frequencies higher than respective frequencies at which antenna resonating element 80-2 conveys radio-frequency signals. As an example, antenna resonating element 80-2 may be configured to convey radio-frequency signals in a 2.4 GHz frequency band (e.g., a 2.4 GHz WLAN band, the 2.4 GHz Bluetooth® band, etc.) while antenna resonating element 80-1 may be configured to convey radio-frequency signals in a 5 GHz frequency band (e.g., a 5 GHz WLAN band). If desired, one or both of antenna resonating element 80-2 and 80-1 may operate in or cover different frequency bands such as cellular telephone frequency bands or other frequency bands.

Conductive structure 92 in which slot element 94 is formed may be disposed between antenna resonating elements 80-1 and 80-2 and feed element 52. As shown in FIG. 6, slot 94 may be a closed slot having four lateral edges surrounded by conductive structure 92. Feed element 52 underneath conductive structure 92 (in the perspective of FIG. 6) may overlap a central portion of slot element 94. Antenna resonating element 80-1 above conductive structure 92 (in the perspective of FIG. 6) may overlap a first end of slot element 94, while antenna resonating element 80-2 above conductive structure 92 (in the perspective of FIG. 6) may overlap a second opposing end of slot element 94. The first and second ends of slot element 94 may be on opposing sides of the central portion. In such manner, antenna resonating elements 80-1 and 80-2 may each be laterally offset from feed element 52 (e.g., not directly overlap feed element 52).

The relative arrangements between the feed element, the one or more antenna resonating elements to which it is wirelessly coupled, and optionally, an intervening slot element, and their respective implementations may be provided in any suitable manner. As an illustrative example, other geometries for strip or patch antenna resonating elements and/or other types of (e.g., non-patch and non-strip) antenna resonating elements may be used to implement antenna resonating elements 80-1 and 80-2. As another illustrative example, other slot geometries (e.g., meandering, non-linear, etc.) and/or other types of (e.g., non-slot) frequency selective filtering layers may be used to implement conductive structure 92.

Arrangements in which the feed element and antenna resonating element are disposed on the same side of a system substrate (e.g., substrate 60) and/or the same side of a package substrate (e.g., substrate 64) as described in connection with FIGS. 3-6 are illustrative one of many possible arrangements.

Figure 7:
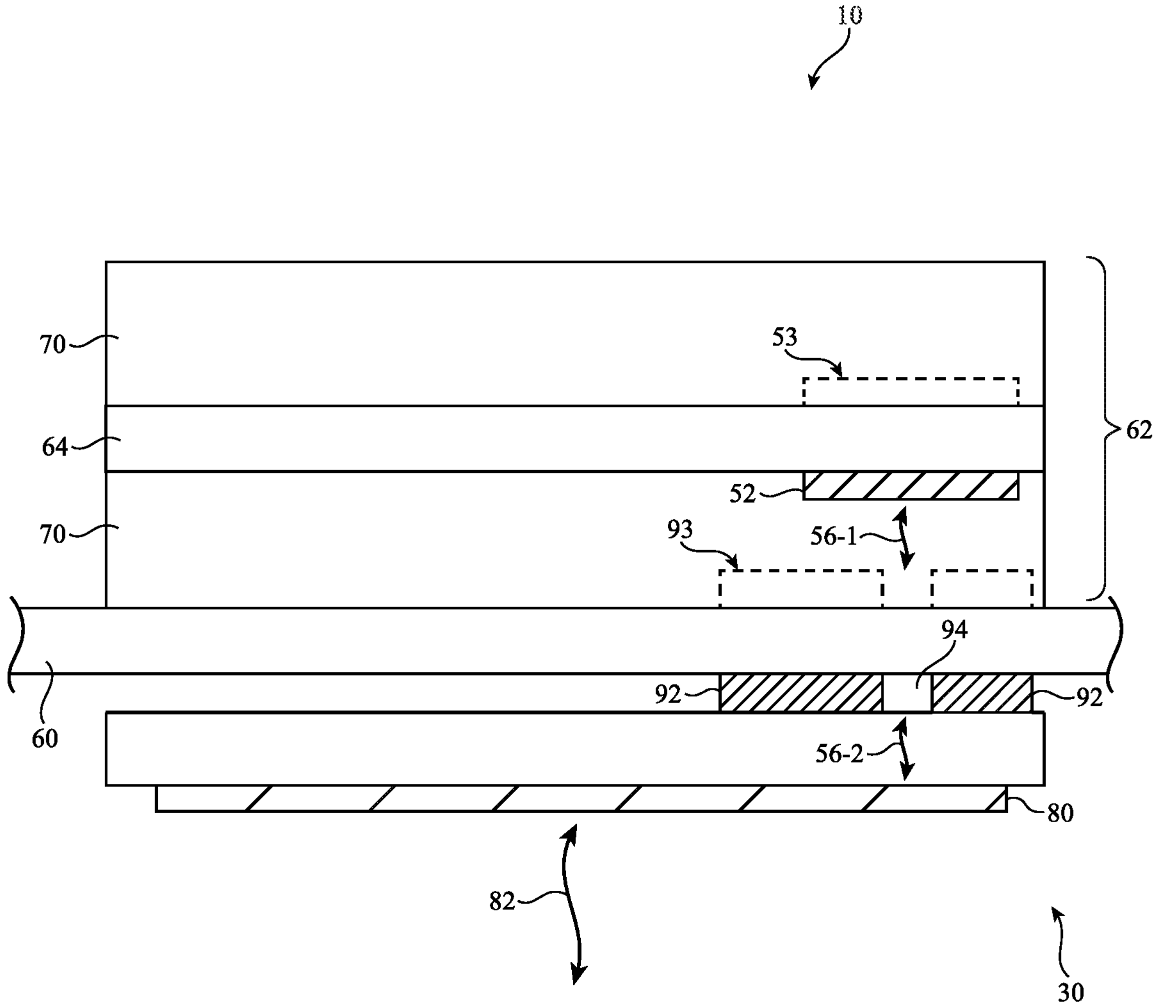
FIG. 7 is a cross-sectional view of illustrative antenna structures having portions disposed on opposing sides of a printed circuit substrate in accordance with some embodiments.

FIG. 7 is a cross-sectional view of a portion of device 10 illustrative various locations at which one or more antenna feed elements and antenna elements may be disposed. As shown in FIG. 7, system substrate 60 may have first and second opposing sides. Package 62 such as a SiP package may be mounted to a first side of system substrate 60 (the top side of substrate 60 in the perspective of FIG. 7). An antenna substrate such as support structure 78 may be mounted to a second opposing side of system substrate 60 (the bottom side of substrate 60) in the perspective of FIG. 7).

In one illustrative arrangement, feed element 52 within package 62 may be formed on a first side of package substrate 64 that faces conductive structure 80 (forming one or more slot and/or strip antenna resonating elements). In another illustrative arrangement, feed element 52 within package 62 may be formed on a second side of package substrate 64 at location 53 (on the top side of package substrate 64 in the perspective of FIG. 7).

If desired, a conductive structure forming an intervening slot element as described in connection with FIGS. 5 and 6 may be provided between feed element 52 and conductive structure 80. In one illustrative arrangement, conductive structure 92 and slot element 94 may be disposed on the second side of system substrate 60 (the bottom side of system substrate 60 in the perspective of FIG. 7). In this illustrative arrangement, conductive structure 92 may be formed from metal traces on system substrate 60, may be formed on support structure 78, may be formed on a separate substrate, etc. In another illustrative arrangement, conductive structure 92 may be formed on the first side of system substrate 60 at location 93 (the top side of system substrate 60 in the perspective of FIG. 7).

In illustrative arrangements where the wireless coupling between feed element 52 and conductive structure 92 (or between feed element 52 and conductive structure 80) pass through package substrate 64 and/or system substrate 60, the overlapping portion of the substrate may be substantially free of conductive material. Similarly, in illustrative arrangements where the wireless coupling between conductive structure 92 and conductive structure 80 passes through system substrate 60, the overlapping portion of substrate 60 may be substantially free of conductive material.

While the various conductive structures (e.g., the conductive structure forming feed element 52, conductive structure 92, and conductive structure 80) are depicted as being formed on a surface of substrate, this is illustrative of one out of many possible arrangements. If desired, these conductive structures may be formed from conductive material such as conductive traces embedded within corresponding support structures and/or substrates.

The foregoing is illustrative of some of many possible arrangements and various modifications can be made to the described embodiments. The foregoing embodiments may be implemented individually or in any combination.

What is claimed is:

1. An electronic device comprising:
a package including
  a substrate,
  a conductive patch on the substrate, and
  a radio-frequency transmission line coupled to the conductive patch;
a first antenna resonating element external to the package that is fed by the conductive patch via wireless coupling;
a second antenna resonating element external to the package and fed by the conductive patch via wireless coupling, wherein the first and second antenna resonating elements are formed from a same conductive layer; and
a conductive structure with a slot in the conductive structure, wherein the slot has a first portion between the conductive patch and the first antenna resonating element and has a second portion between the conductive patch and the second antenna resonating element.

2. The electronic device of claim 1, wherein the package includes an encapsulation over the substrate and the conductive patch, the first antenna resonating element being disposed over the encapsulation.

3. The electronic device of claim 2 further comprising:
a dielectric support disposed over the encapsulation, wherein the first antenna resonating element is disposed on the dielectric support.

4. The electronic device of claim 1, wherein the first antenna resonating element comprises a first slot element in the conductive layer that overlaps the conductive patch and the second antenna resonating element comprises a second slot element in the conductive layer that overlaps the conductive patch.

5. The electronic device of claim 1, wherein the first antenna resonating element comprises a first strip of conductive material in the conductive layer and the second antenna resonating element comprises a second strip of conductive material in the conductive layer.

6. The electronic device of claim 5, wherein the first and second strips of conductive material have different dimensions.

7. The electronic device of claim 1, wherein the first antenna resonating element comprises a first additional conductive patch, the second antenna resonating element comprises a second additional conductive patch, and the conductive patch overlaps a third portion of the slot between the first portion and the second portion.

8. The electronic device of claim 1, wherein the package comprises an inductor or a capacitor coupled to the conductive patch.

9. The electronic device of claim 1 further comprising:
a printed circuit substrate, the package being mounted to a first side of the printed circuit substrate and the first antenna resonating element being mounted to a second side of the printed circuit substrate.

10. The electronic device of claim 1 further comprising:
a printed circuit substrate, the package being mounted to a side of the printed circuit substrate and the first antenna resonating element being disposed over the side of the printed circuit substrate.

11. Wireless circuitry comprising:
a substrate;
a radio component mounted to the substrate;
a signal conductor for a radio-frequency transmission line;
an antenna feed element coupled to the radio component by the signal conductor;
an encapsulation over the substrate, the radio component, and the antenna feed element;
a conductive layer over the encapsulation; and
a slot element in the conductive layer that forms a slot antenna resonating element electromagnetically coupled to the antenna feed element, wherein the slot element has a closed end, an open end, and at least first and second non-parallel segments between the closed end and the open end and wherein the first segment overlaps the antenna feed element.

12. The wireless circuitry of claim 11 further comprising:
an electromagnetic shielding layer over the encapsulation, wherein an opening in the electromagnetic shielding layer is aligned with the antenna feed element.

13. The wireless circuitry of claim 12 further comprising:
an interposer mounted to the substrate and configured to provide an input-output interface for the radio component, wherein at least a portion of the radio-frequency transmission line is formed from a signal path in the interposer.

14. The wireless circuitry of claim 11 further comprising:
a non-radio component mounted to the substrate, wherein the encapsulation is disposed over the non-radio component.

15. The wireless circuitry of claim 14, wherein the radio component comprises a first integrated circuit die mounted to the substrate and the non-radio component comprises a second integrated circuit die mounted to the substrate.

16. The wireless circuitry of claim 11 further comprising:
an additional slot element in the conductive layer and electromagnetically coupled to the antenna feed element, wherein the additional slot element has first and second non-parallel segments and wherein the first segment of the additional slot element overlaps the antenna feed element.

17. The wireless circuitry of claim 16, wherein the first segment of the slot element and the first segment of the additional slot element are parallel.

* * * * *